(12) United States Patent
Masuda et al.

(10) Patent No.: US 11,830,674 B2
(45) Date of Patent: Nov. 28, 2023

(54) CERAMIC ELECTRONIC DEVICE

(71) Applicant: TAIYO YUDEN CO., LTD., Tokyo (JP)

(72) Inventors: Hidetoshi Masuda, Takasaki (JP); Minoru Ryu, Takasaki (JP); Teruo Atsumi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 103 days.

(21) Appl. No.: 17/728,130

(22) Filed: Apr. 25, 2022

(65) Prior Publication Data

US 2022/0384109 A1 Dec. 1, 2022

(30) Foreign Application Priority Data

May 31, 2021 (JP) ................................. 2021-091228

(51) Int. Cl.
*H01G 4/008* (2006.01)
*H01G 4/12* (2006.01)
*H01G 4/30* (2006.01)

(52) U.S. Cl.
CPC ........... *H01G 4/008* (2013.01); *H01G 4/1227* (2013.01); *H01G 4/30* (2013.01)

(58) Field of Classification Search
CPC ......... H01G 4/008; H01G 4/1227; H01G 4/30
See application file for complete search history.

(56) References Cited

U.S. PATENT DOCUMENTS

| | | | | |
|---|---|---|---|---|
| 2014/0175942 A1* | 6/2014 | Banno | ..................... | H10N 30/50 336/200 |
| 2019/0304695 A1 | 10/2019 | Kim et al. | | |
| 2022/0139630 A1* | 5/2022 | Yamada | ................. | H01G 4/232 361/321.2 |
| 2023/0084921 A1* | 3/2023 | Masuda | .................... | H01G 4/30 361/301.4 |
| 2023/0094498 A1* | 3/2023 | Mizuno | .................. | H01G 4/008 361/301.4 |
| 2023/0128407 A1* | 4/2023 | Masuda | ............... | H01G 4/0085 361/301.4 |

(Continued)

FOREIGN PATENT DOCUMENTS

| | | |
|---|---|---|
| JP | 2003007562 A | 1/2003 |
| JP | 2019176117 A | 10/2019 |

*Primary Examiner* — Nathan Milakovich
(74) *Attorney, Agent, or Firm* — Law Office of Katsuhiro Arai

(57) ABSTRACT

A ceramic electronic device includes a multilayer chip in which a plurality of dielectric layers and a plurality of internal electrode layers are stacked. The plurality of internal electrode layers include Au. Each of the plurality of internal electrode layers includes an Au-containing layer of which an Au concentration with respect to all detected elements is 5 at % or more, on an interface between the each of the plurality of internal electrode layers and a dielectric layer next to the each of the plurality of internal electrode layers. A relationship of C≤500×t/T is satisfied when a thickness of the each of the plurality of internal electrode layers is T nm, a thickness of the Au-containing layer is t nm, and an Au concentration with respect to a total of Ni and Au in a whole of the each of the plurality of internal electrode layers is C at %.

11 Claims, 15 Drawing Sheets

(56) References Cited

U.S. PATENT DOCUMENTS

| | | | |
|---|---|---|---|
| 2023/0290576 A1* | 9/2023 | Mizuno | H01G 4/008 361/301.4 |
| 2023/0298820 A1* | 9/2023 | Masuda | H01G 4/1227 361/301.4 |

\* cited by examiner

CERAMIC ELECTRONIC DEVICE

CROSS-REFERENCE TO RELATED APPLICATION

This application is based upon and claims the benefit of priority of the prior Japanese Patent Application No. 2021-091228, filed on May 31, 2021, the entire contents of which are incorporated herein by reference.

FIELD

A certain aspect of the present invention relates to a ceramic electronic device.

BACKGROUND

Electronic devices are being downsized. Therefore, downsizing of ceramic electronic devices such as multilayer ceramic capacitors mounted on the electronic devices is requested. As methods for enlarging capacity which is a basic characteristic, there are three methods of (1) enlarging a dielectric constant of dielectric layers, (2) enlarging an area for regulating the capacity, and (3) reducing the thickness of the dielectric layers. In a case where the dielectric constant and the device size are determined, when the dielectric layers are thin, the capacity per a single dielectric layer becomes larger. In this case, when the dielectric layers and the internal electrode layers are thin, the number of stacked layers per a thickness unit becomes larger. Therefore, the structure has an advantage.

SUMMARY OF THE INVENTION

According to an aspect of the present invention, there is provided a ceramic electronic device including: a multilayer chip in which a plurality of dielectric layers of which a main component is ceramic and a plurality of internal electrode layers are stacked, wherein a main component of the plurality of internal electrode layers is Ni, wherein the plurality of internal electrode layers include Au, wherein each of the plurality of internal electrode layers includes an Au-containing layer of which an Au concentration with respect to all detected elements is 5 at % or more, on an interface between the each of the plurality of internal electrode layers and a dielectric layer next to the each of the plurality of internal electrode layers, and wherein a relationship of $C \leq 500 \times t/T$ is satisfied when a thickness of the each of the plurality of internal electrode layers is T nm, a thickness of the Au-containing layer is t nm, and an Au concentration with respect to a total of Ni and Au in a whole of the each of the plurality of internal electrode layers is C at %.

According to another aspect of the present invention, there is provided a ceramic electronic device including: a multilayer chip in which a plurality of dielectric layers of which a main component is ceramic and a plurality of internal electrode layers are stacked, wherein a main component of the plurality of internal electrode layers is Ni, wherein the plurality of internal electrode layers include Au, wherein each of the plurality of internal electrode layers include an Au-containing layer of which an Au concentration with respect to all detected elements is 5 at % or more, on an interface between each of the plurality of dielectric layers and each of the plurality of internal electrode layers, and wherein a difference between an Au concentration with respect to all detected elements of a whole of the Au containing layer and an Au concentration with respect to all detected elements of a whole of a portion other than the Au-containing layer in each of the plurality of internal electrode layers is 0.5 at % or more.

DETAILED DESCRIPTION

When the thickness of the dielectric layers is reduced, electric field intensity applied to the dielectric layers gets larger with respect to the same usage voltage. Therefore, the insulation reliability may be degraded. In order to secure the insulation reliability of the dielectric layers having a small thickness, it is thought that a noble metal having bad wettability with respect to the dielectric layers is added to a ceramic material and metal conductive paste for the internal electrode layers, and a thin layer of the added metal is formed on an interface between the internal electrode layer and the dielectric layer (for example, see Japanese Patent Application Publication No. 2003-007562).

When the internal electrode layers are thin, the internal electrode layers may be easily broken in a firing process. In this case, an extra section not contributing the capacity is formed. In order to secure a continuity of the thin internal electrode layers, it is thought that another metal is added to internal electrode paste and the added metal covers an external circumference of the internal electrode and a co-material after the firing (for example, see Japanese Patent Application Publication No. 2019-176117).

However, with the above-mentioned technology of the patent documents, the added amount of Au gets larger. When the amount of Au is large, the breaking of the internal electrode layers may be accelerated.

A description will be given of an embodiment with reference to the accompanying drawings.

Embodiment

Figure 1:
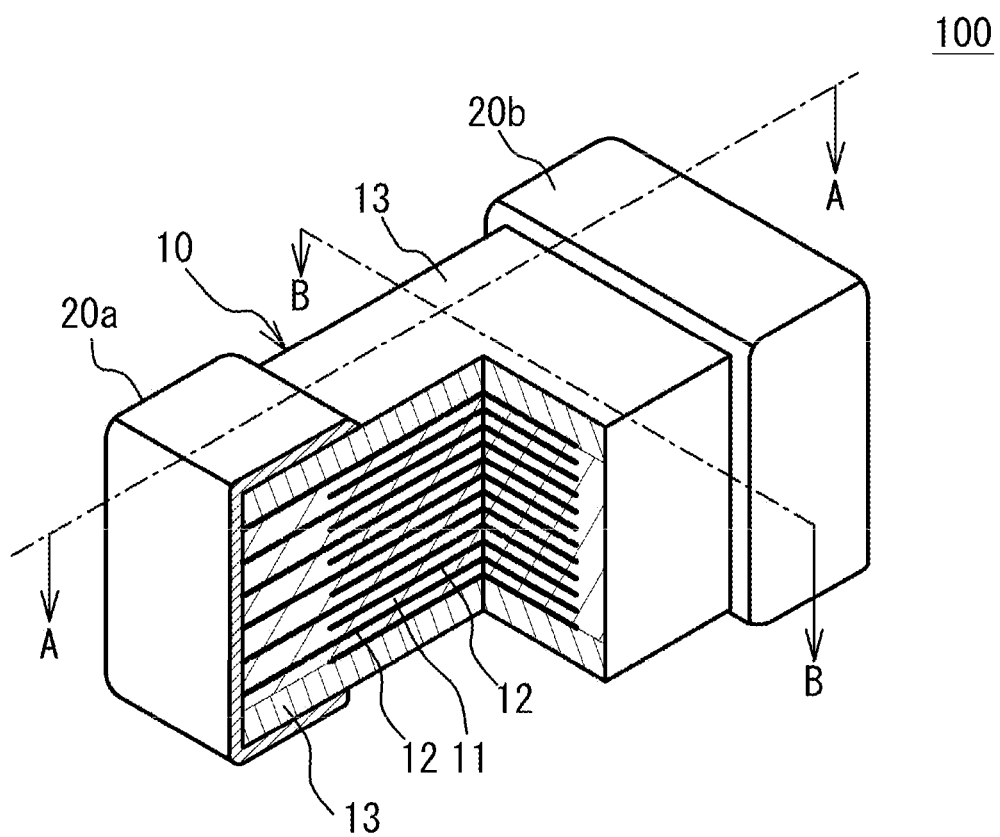
FIG. 1 illustrates a perspective view of a multilayer ceramic capacitor in which a cross section of a part of the multilayer ceramic capacitor is illustrated.
Figure 2:
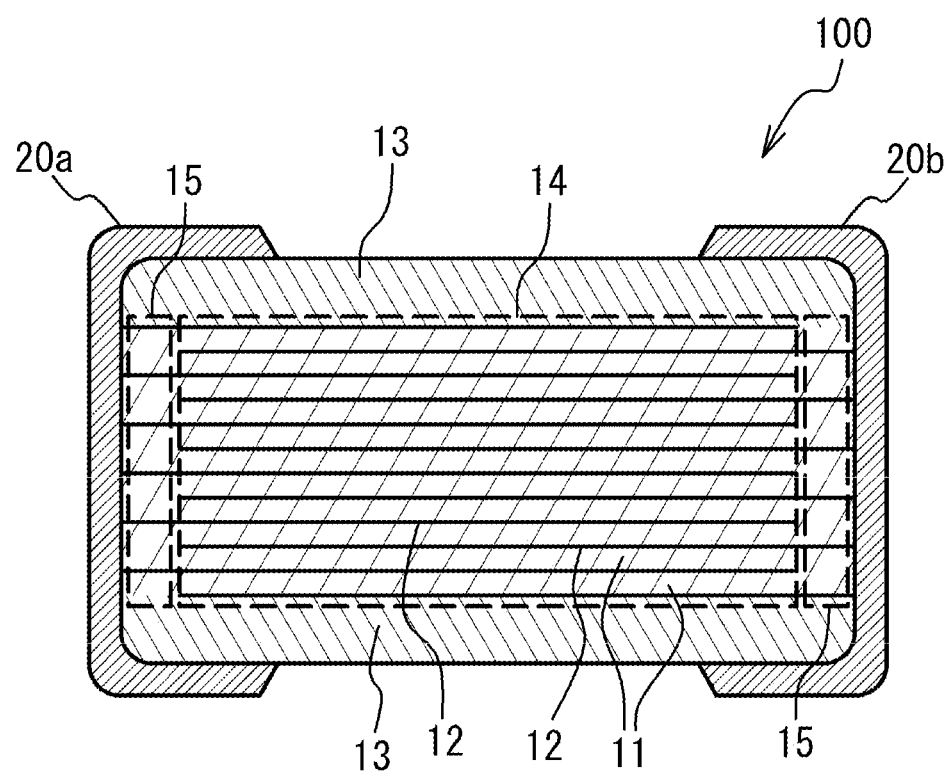
FIG. 2 illustrates a cross sectional view taken along a line A-A of FIG. 1.
Figure 3:
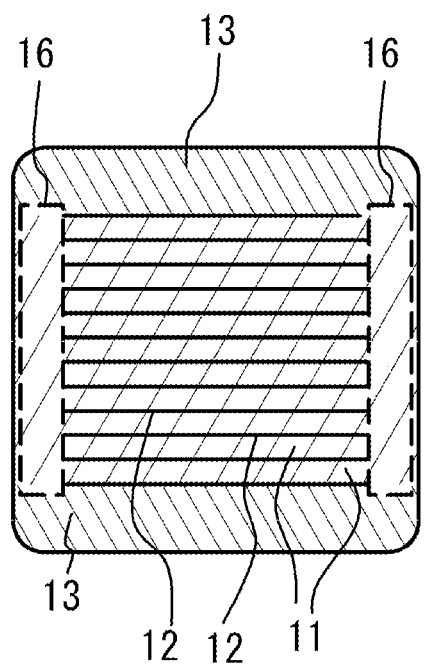
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the dielectric layers 11 is a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

From a viewpoint of downsizing the multilayer ceramic capacitor 100 and enlarging the capacity of the multilayer ceramic capacitor 100, it is preferable that the thickness of the dielectric layers 11 is small. For example, each thickness of the dielectric layers 11 may be 0.05 μm or more and 5 μm or less, 0.1 μm or more and 3 μm or less, or 0.2 μm or more and 1 μm or less.

However, when the thickness of the dielectric layers 11 is reduced, electric field intensity applied to the dielectric layers 11 gets larger with respect to the same usage voltage. Therefore, the insulation reliability may be degraded. In order to secure the insulation reliability of the dielectric layers 11 having a small thickness, it is thought that Au having bad wettability with respect to the dielectric layers 11 is added to the dielectric material for the dielectric layers 11 and the metal conductive paste for the internal electrode layers 12, and the dielectric material and the metal conductive paste are fired, and a thin layer of Au is formed on an interface between the internal electrode layer 12 and the dielectric layer 11.

A description will be given of formation of an Au layer of 1 nm or more on an interface between the internal electrode layer 12 and the dielectric layer 11. On a presumption that there are Au layers of 10 nm on both faces of the internal electrode layer 12 of Ni of 500 nm, the Au concentration (amount of Au with respect to total of Au and Ni) is approximately 4 at % with only the amount of Au of both of the faces, although the thickness of the internal electrode layer 12 has influence. All added Au it not accumulated on the interface between the dielectric layer 11 and the internal electrode layer 12. Therefore, the Au concentration of the internal electrode layer 12 gets larger when Au is added to metal conductive paste. On the other hand, a melting point of an alloy of Ni and Au is lower than a melting point of Ni. For example, when the Au concentration is 4 at %, an liquid phase appears at 1300 degrees C. or less/ In the firing process, the internal electrode layer 12 and the dielectric layer 11 are fired together with each other in a temperature range of 1000 degrees C. to 1300 degrees C. Therefore, migration of a metal is accelerated even if the internal electrode layer 12 is not melted during the firing process. In this case, breaking or spheroidizing of the internal electrode layer 12 is accelerated. When the breaking or spheroidizing progresses, the capacity may be reduced or short may occur by contacting of a positive electrode and a negative electrode. Au acting as a noble metal is expensive. When the added amount of Au is large, the cost may rapidly increases more than a case where the internal electrode layer 12 is formed with only Ni.

Accordingly, the multilayer ceramic capacitor 100 of the embodiment has a structure that is capable of suppressing breaking of the internal electrode layers, reducing the cost, and improving the insulation reliability.

Figure 4:
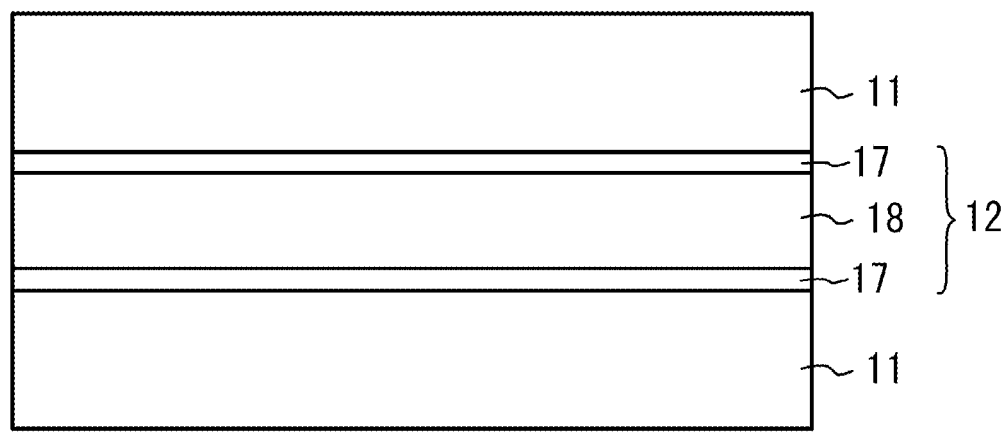
FIG. 4 illustrates details of an internal electrode layer.
Figure 5A:
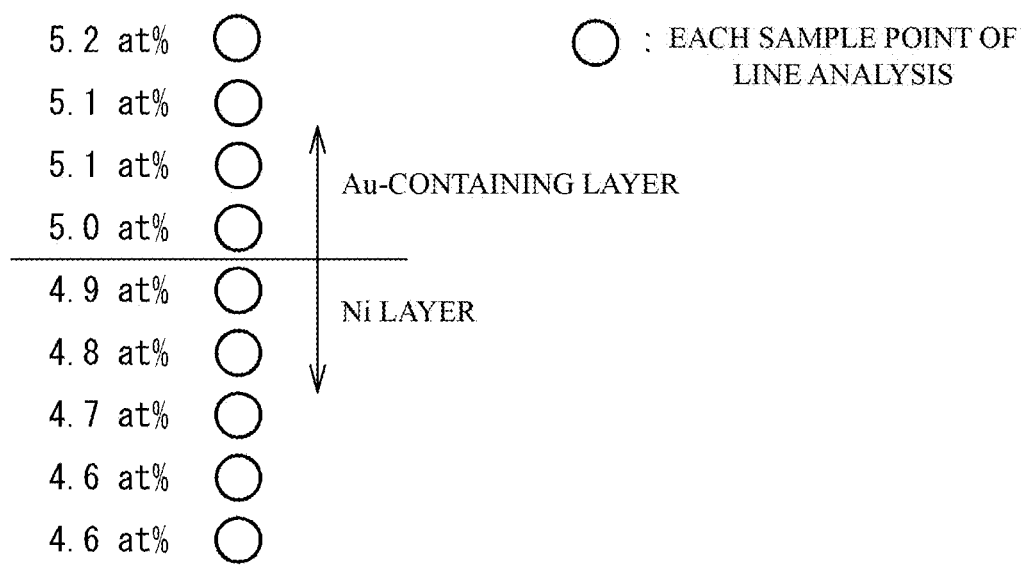
FIG. 5A and FIG. 5B illustrate a measuring method of an Au concentration.
Figure 5B:
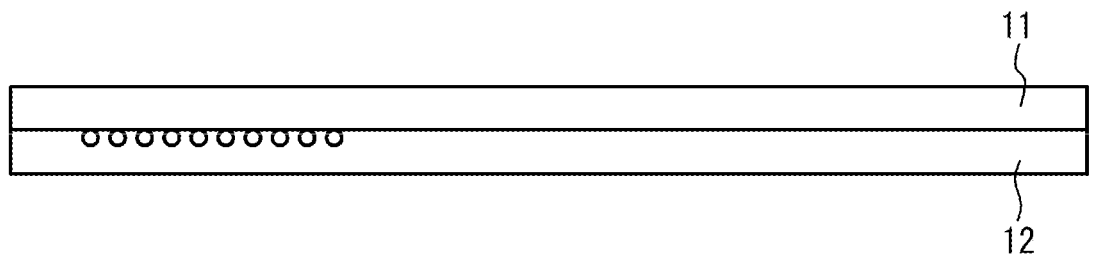

In the embodiment, as illustrated in FIG. 4, the internal electrode layer 12 has Au-containing layers 17 on the interfaces between the internal electrode layer 12 and the dielectric layers 11. An Au concentration with respect all detected elements of the Au-containing layers 17 is 5 at % or more. The Au-containing layers 17 may be made of only Au. The Au-containing layers 17 may include other elements such as Ni. The rest of the internal electrode layer 12 other than the Au-containing layers 17 is a Ni layer 18 of which an Au concentration with respect to all detected elements is less than 5 at %. The Au-containing layers 17 may be provided on all of the interfaces between the internal electrode layer 12 and the dielectric layers 11. The Au-containing layers 17 may be provided on only a part of the interfaces between the internal electrode layer 12 and the dielectric layers 11. However, it is preferable that the Au-containing layers 17 are provided on all of the interfaces between the internal electrode layer 12 and the dielectric layers 11. As illustrated in FIG. 5A, a line analysis is performed with respect to each element at each sample point along the stacking direction in a TEM image. The Au-containing layer 17 is defined as a set of sample points where the Au concentration with respect to all detected elements is 5 at % or more. The Ni layer 18 is defined as a set of sample points where the Au concentration with respect to all detected elements is less than 5 at % when performing the line analysis along the stacking direction. An interval of each sample point is, for example, 0.05 nm. There may be variation in the Au concentrations with respect to all detected elements. Accordingly, for example, as illustrated with circles of FIG. 5B, the line analysis may be performed with respect to 10 different points in the extension direction of the internal electrode layer 12 near the interface between the dielectric layer 11 and the internal electrode layer 12. And an average of the line analysis may be used. For example, each average may be an average of the Au concentrations of the 10 points at the same height in the stacking direction.

In the embodiment, the thickness of the internal electrode layer 12 in the cross section of the internal electrode layer 12 in the stacking direction is referred to as T (nm). The thickness of the Au-containing layer 17 in the cross section is referred to as t (nm). A concentration of Au with respect to the total amount of Ni and Au in the whole of the internal electrode layer 12 is C (at %). In this case, the relationship of "C≤500×t/T" is satisfied. When the Au-containing layer 17 is provided on both of the upper face and the lower face of the internal electrode layer 12, the thickness t is the thickness of one of the Au-containing layer 17. The thickness of the Au-containing layer 17 may be obtained by calculating an average of the thicknesses in a length range of 15 nm in the extension direction of the internal electrode layer 12 in a TEM (Transmission Electron Microscope) image.

In the embodiment, the Au-containing layer 17 of which the concentration of Au acting as a noble metal is provided on area where the dielectric layer 11 contacts the internal electrode layer 12. It is therefore possible to improve the insulation reliability by the function of the interface barrier. Moreover, it is possible to reduce the Au concentration in the internal electrode layer 12 because the relationship of "C≤500×t/T" is satisfied. And it is possible to keep the melting point of the Au—Ni alloy at a predetermined temperature or more. And it is possible to decrease the damage of the internal electrode layer 12 caused by the firing. Accordingly, it is possible to suppress the breaking of the internal electrode layer 12 and secure desirable element characteristic.

The usage amount of Au which is an expensive material can be reduced. It is therefore possible to reduce product cost. Moreover, recycle technology of Au is established. It is therefore possible to use a large amount of the recycle source such as urban mine. Accordingly, it is possible to reduce environmental burden.

From a viewpoint of reduction of the amount of Au in the internal electrode layers 12, it is preferable that the thickness t of the Au-containing layer 17 is small. Accordingly, it is preferable that the thickness t of the Au-containing layer 17 has an upper limit. For example, it is preferable that the thickness t of the Au-containing layer 17 is 1 nm or less than 1 nm. It is more preferable that the thickness t of the Au-containing layer 17 is 0.8 nm or less. It is still more preferable that the thickness t of the Au-containing layer 17 is 0.6 nm or less.

It is preferable that the Au concentration with respect to all detected elements in the whole of the Au-containing layer 17 is 8 at % or more. It is more preferable that the Au concentration with respect to all detected elements in the whole of the Au-containing layer 17 is 10 at % or more. It is possible to measure the Au concentration with respect to all detected elements in the whole of the Au-containing layer 17 by calculating an average value of Au concentrations with respect to all detected elements at sample points along the stacking direction when performing a line analysis of each element concentration at the sample points.

When the amount of Au in the Au-containing layer 17 is excessively large, a melting point may be reduced. Accordingly, it is preferable that the Au concentration with respect to all detected elements in the Au-containing layer 17 has an upper limit. For example, it is preferable that the Au concentration with respect to all detected elements in the Au-containing layer 17 is 15 at % or less. It is more preferable that the Au concentration with respect all detected elements in the Au-containing layer 17 is 13 at % or less. It is still more preferable that the Au concentration with respect to all detected elements in the Au-containing layer 17 is 12 at % or less.

From a viewpoint of reduction of a usage amount of Au, it is preferable that the Au concentration with respire to a total amount of Ni and Au in the whole of the internal electrode layer 12 has an upper limit. For example, it is preferable that the Au concentration with respect to the total amount of Ni and Au in the whole of the internal electrode layer 12 is 20 at % or less. It is more preferable that the Au concentration with respect to the total amount of Ni and Au in the whole of the internal electrode layer 12 is 2 at % or less. It is still more preferable that the Au concentration with respect to the total amount of Ni and Au in the whole of the internal electrode layer 12 is 1 at % or less.

From a viewpoint of reduction of a usage amount of Au, it is preferable that the Au concentration with respect to a total amount of Ni and Au in the Ni layer 18 has an upper limit. For example, it is preferable that the Au concentration with respect to the total amount of Ni and Au in the Ni layer 18 is 20 at % or less. It is more preferable that the Au concentration with respect to the total amount of Ni and Au in the Ni layer 18 is 1 at % or less. It is still more preferable that the Au concentration with respect to the total amount of Ni and Au in the Ni layer 18 is 0.5 at % or less. When the Au-containing layer 17 is provided, the Ni layer 18 also includes Au. For example, the Au concentration with respect to the total amount of Ni and Au in the Ni layer 18 is 0.01 at % or more.

The thickness T of each of the internal electrode layers 12 may be 10 nm or more and 1000 nm or less. The thickness T may be 20 nm or more and 500 nm or less. The thickness T may be 50 nm or more and 300 nm or less.

Ni and Au may diffuse into the ceramic having the perovskite structure of the dielectric layers 11, during the firing of the dielectric layers 11 and the internal electrode layers 12. Details will be described later. However, Ni diffuses easier than Au. Therefore, the Ni concentration is higher than the Au concentration on the surface of the dielectric layer 11 on the side of the internal electrode layer 12.

Second Embodiment

In a second embodiment, a description will be given of points different from those of the first embodiment. In the second embodiment, a difference between the Au concentration with respect to all detected element of the whole of the Au-containing layer 17 and the Au concentration with respect to all detected elements of the whole of the Ni layer 18 is 0.5 at % or more.

In the embodiment, the Au-containing layer 17 of which the concentration of Au acting as a noble metal is provided on an area where the dielectric layer 11 contacts the internal electrode layer 12. It is therefore possible to improve the insulation reliability by the function of the interface barrier. Moreover, it is possible to reduce the Au concentration in the internal electrode layer 12 because the difference between the Au concentration with respect to all detected element of the whole of the Au-containing layer 17 and the Au concentration with respect to all detected elements of the whole of the Ni layer 18 is 0.5 at % or more. And it is possible to keep the melting point of the Au—Ni alloy at a predetermined temperature or more. And it is possible to decrease the damage of the internal electrode layer 12 caused by the firing. Accordingly, it is possible to suppress the breaking of the internal electrode layer 12 and secure desirable element characteristic.

The usage amount of Au which is an expensive material can be reduced. It is therefore possible to reduce product cost. Moreover, recycle technology of Au is established. It is therefore possible to use a large amount of the recycle source such as urban mine. Accordingly, it is possible to reduce environmental burden.

It is preferable that the difference between the Au concentration with respect to all detected elements in the whole of the Au-containing layer 17 and the Au concentration with respect to all detected elements in the whole of the Ni layer 18 is 5 at % or more. It is more preferable that a difference between the Au concentration with respect to all detected elements in the whole of the Au-containing layer 17 and the Au concentration with respect to all detected elements in the whole of the Ni layer 18 is 10 at % or more.

When the amount of Au in the Au-containing layer 17 is excessively large, a melting point may be reduced. Accordingly, it is preferable that the difference between the Au concentration with respect to all detected elements in the whole of the Au-containing layer 17 and the Au concentration with respect to all detected elements in the whole of the Ni layer 18 has an upper limit. It is preferable that the difference between the Au concentration with respect to all detected elements in the whole of the Au-containing layer 17 and the Au concentration with respect to all detected elements in the whole of the Ni layer 18 is 15 at % or less. It is more preferable that the difference between the Au concentration with respect to all detected elements in the whole of the Au-containing layer 17 and the Au concentration with respect to all detected elements in the whole of the Ni layer 18 is 13 at % or less. It is still more preferable that the difference between the Au concentration with respect to all detected elements in the whole of the Au-containing layer 17 and the Au concentration with respect to all detected elements in the whole of the Ni layer 18 is 12 at % or less.

From a viewpoint of reduction of a usage amount of Au, it is preferable that the Au concentration with respect to all detected elements in the whole of the Ni layer 18 is small. For example, it is preferable that the Au concentration with respect to all detected elements in the whole of the Ni layer 18 is 0 at % or more and 4.5 at % or less. It is more preferable that the Au concentration with respect to all detected elements in the whole of the Ni layer 18 is 3 at % or less. It is still more preferable that the Au concentration with respect to all detected elements in the whole of the Ni layer 18 is 2 at % or less.

Figure 6:
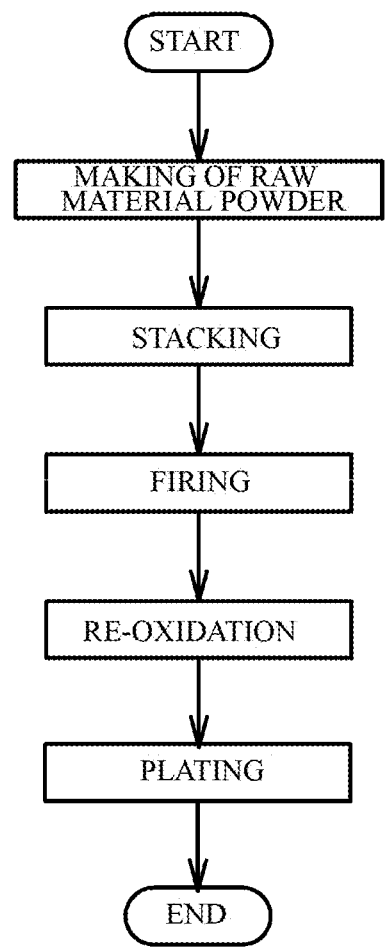
FIG. 6 illustrates a manufacturing method of a multilayer ceramic capacitor

Next, a description will be given of a manufacturing method of the multilayer ceramic capacitors 100 of the first embodiment and the second embodiment. FIG. 6 illustrates a manufacturing method of the multilayer ceramic capacitors 100.

Making Process of Raw Material Powder

A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

Stacking Process

Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 having a thickness of 0.5 μm or more and 1.0 μm or less is painted on a base material 51 by, for example, a die coater method or a doctor blade method, and then dried. The base material 51 is, for example, PET (polyethylene terephthalate) film.

Figure 7A:
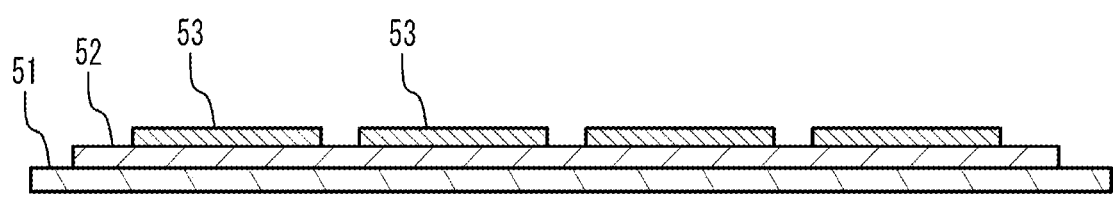
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The forming method is not limited. For example, a vacuum deposition method such as a sputtering method using a Nu-Au alloy target may be performed. A simultaneous sputtering using individual targets of Ni and Au may be performed. Electrode paste including a mixture of Ni metal powder and Au metal powder may be used. The dielectric green sheet 52 on which the internal electrode pattern 53 is formed is a stack unit.

Figure 7B:
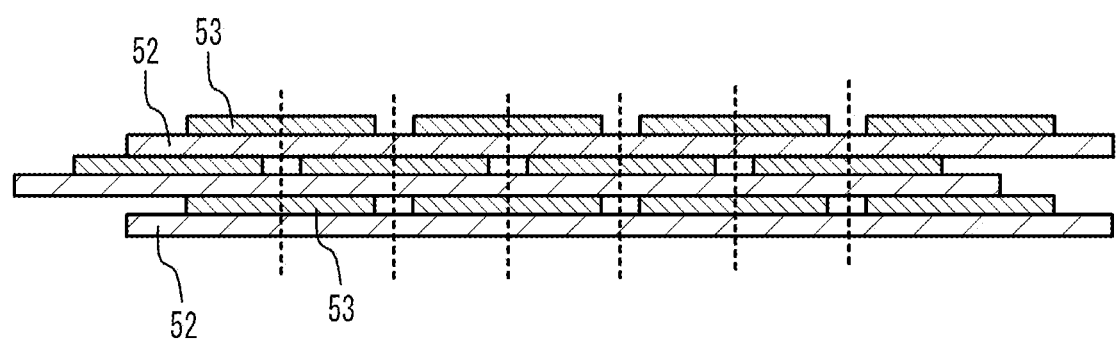

Next, the dielectric green sheets 52 are peeled from the base materials 51. As illustrated in FIG. 7B, the stack units are stacked.

A predetermined number (for example, 2 to 10) of a cover sheet is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of the cover sheet may be the same as those of the dielectric green sheet 52. Additives of the cover sheet may be different from those of the dielectric green sheet 52.

Firing Process

The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

Re-Oxidizing Process

After that, a re-oxidizing process may be performed in $N_2$ gas atmosphere in a temperature range of 600 degrees C. to 1000 degrees C.

Plating Process

After that, by a plating method, metal layers such as Cu, Ni, Sn or the like may be plated on the external electrodes 20a and 20b.

In the manufacturing method of the multilayer ceramic capacitor 100, the metal component of the internal electrode pattern 53 diffuses into the ceramic having the perovskite structure of the dielectric layer 11 during the firing of the internal electrode pattern 53. However, Au is more unstable than Ni in the ceramic having the perovskite structure. Therefore, Ni diffuses into the dielectric layer 11 more easily than Au. Accordingly, the Au-containing layer 17 is formed on the interface between the internal electrode layer 12 and the dielectric layer 11.

Figure 8:
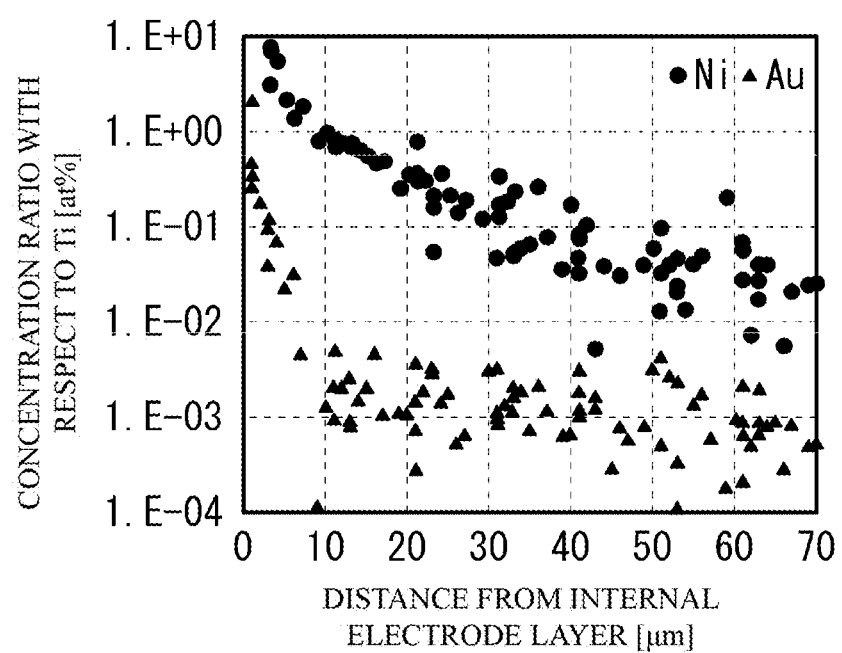
FIG. 8 illustrates experimental results of diffusion of Ni and Au into a dielectric layer.

FIG. 8 illustrates experimental results of diffusion of Ni and Au into the dielectric layer 11 in a case where the main component ceramic of the dielectric green sheet 52 is barium titanate and the metal component of the internal electrode pattern 53 is Ni and Au. In FIG. 8, the horizontal axis indicates the distance from the internal electrode layer 12. The horizontal axis indicates the distance from the surface of the dielectric layer 11 into inside. The vertical axis indicates the concentration with respect to the amount of Ti. The atomic concentration ratio of Ni and Au in the internal electrode pattern 53 is 96:2. From the result of FIG. 8, in the dielectric layer 11, the amount of Au is smaller than the ratio of Ni:Au=96:2 in the dielectric layer 11. From the result, Ni diffuses into the ceramic having the perovskite structure easier than Au.

Figure 9A:
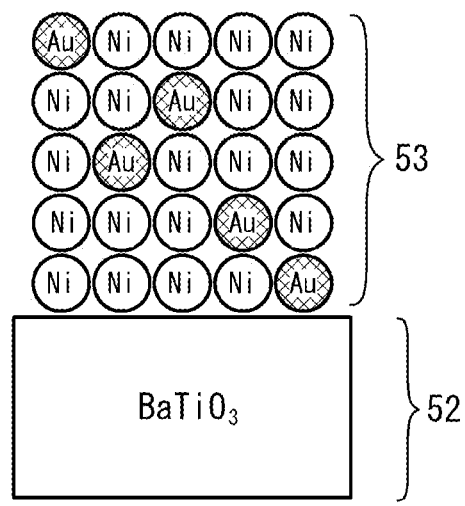
FIG. 9A to FIG. 9C illustrate mechanism of formation of an Au-containing layer.
Figure 9B:
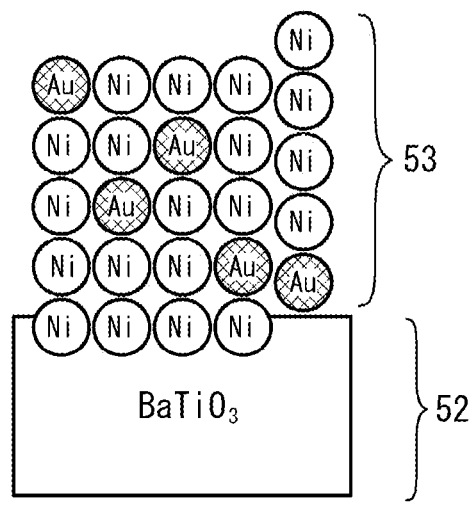
Figure 9C:
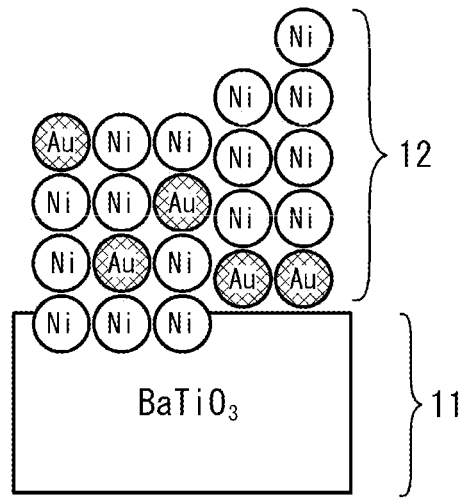

FIG. 9A to FIG. 9C illustrates mechanism of the formation of the Au-containing layer 17. FIG. 9A illustrates the phase before the firing process. As illustrated in FIG. 9A, neither Ni nor Au diffuses into the ceramic having the perovskite structure in the dielectric green sheet 52 before the firing process. FIG. 9B illustrates the phase during the firing process. As illustrated in FIG. 9B, Ni near the dielectric green sheet 52 diffuses in to the ceramic. However, Au hardly diffuses into the ceramic. Thus, Au is accumulated into the interface between the dielectric green sheet 52 and the internal electrode pattern 53 with atomic level. The Au concentration on the interface gets larger. When Au is concentrated on the interface, it is though that the diffusion of Ni into the ceramic is suppressed. FIG. 9C illustrates the phase after the firing process. As illustrated in FIG. 9C, the Au-containing layer having a higher Au concentration is formed on the interface between the dielectric layer 11 and the internal electrode layer 12. Au may be left inside of the internal electrode layer 12.

As mentioned-above, in the manufacturing method of the multilayer ceramic capacitor 100 of the embodiment, the internal electrode layer 12 has the Au-containing layers 17 of which the Au concentration with respect to all detected elements is 5 at % or more, on the interfaces between the internal electrode layer 12 and the dielectric layers 11. It is possible to satisfy the relationship of "C≤500×t/T" in the multilayer ceramic capacitor 100 after the firing by adjusting the thickness of the dielectric green sheet 52, the thickness of the internal electrode pattern 53, the ratio of Ni and Au in the internal electrode pattern 53, or the like. Moreover, the difference between the Au concentration with respect to all detected elements of the whole of the Au-containing layer 17 and the Au concentration with respect to all detected elements of the whole of the Ni layer 18 can be 0.5 at % or more.

For example, when the internal electrode pattern 53 is formed on the dielectric green sheet 52 by the sputtering, uniformity of the condition just after the forming of the internal electrode pattern 53 can be high. In this case, it is possible to stably form the thin Au-containing layer 17. Alternatively, when alloy paste of which the diameter and the concentration are highly uniform and of which the diameter is micro is used, uniformity of the condition just after the forming of the internal electrode pattern 53 can be high. In this case, it is possible to stably form the thin Au-containing layer 17.

Alternatively, the balance of temperature dependence of the sintering characteristic of the dielectric layers 11 is different from that of the diffusion of the internal electrode layers 12. That is, it is possible to sufficiently progress the sintering of the dielectric layers 11 and suppress the growing of the Au-containing layer 17, at a predetermined temperature for a predetermined time. On the other hand, the Au-containing layer 17 grows thick when the sintering sufficiently progresses under another firing process. Accordingly, it is possible to stably form the Au-containing layer 17 by appropriately adjusting the firing temperature, firing time, temperature elevation rate or the like in the firing process.

Figure 10:
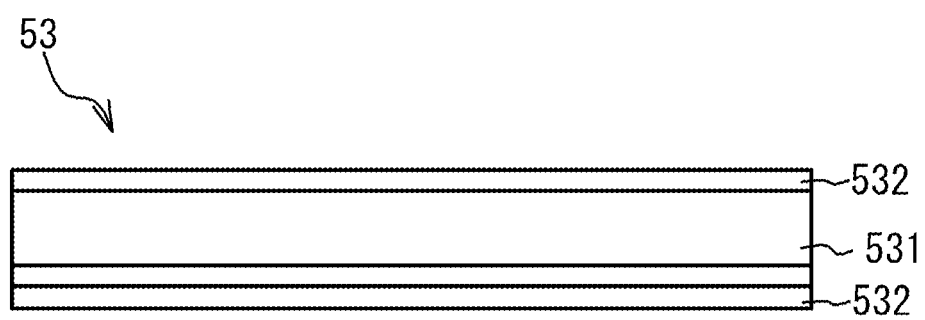
FIG. 10 illustrates another example of formation of an internal electrode pattern.

As illustrated in FIG. 10, a high concentration portion 532 of which the Au concentration is higher than that of a Ni pattern 531 may be formed on an upper face and a lower face of the Ni pattern 531 of which the Au concentration is low, when forming the internal electrode pattern 53. The Ni pattern 531 and the high concentration portion 532 may be formed by the sputtering or the paste printing. The high concentration portion 532 may be made of only Au.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Example 1

An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. Next, an internal electrode pattern was formed on the dielectric green sheet by the sputtering using an Au—Ni alloy target. The internal electrode pattern had a thickness of 200 nm. A mask method using a metal mask was used as a patterning. The Au concentration of the alloy was 1.0 at % with respect to the total amount of Au and Ni. A plurality of the dielectric green sheets on which the internal electrode pattern was formed were stacked. The number of the stack units was 100. Each of the internal electrode patterns were alternately shifted. After that, the resulting ceramic multilayer structure was cut into a chip having a predetermined size. Metal conductive paste to be the base layers of the external electrodes was applied to the two end faces of the ceramic multilayer structure by a dipping method. The ceramic multilayer structure was fired. Thus, multilayer ceramic capacitors were made.

The thickness of the internal electrode layers was 200 nm. An area of 5 μm was observed in a cross section SEM image. An average of thicknesses was calculated as the thickness. An Au-containing layer of which an Au concentration with respect to all detected elements was 5 at % or more was formed on each of interfaces between the internal electrode layers and the dielectric layers. The thickness of the Au-containing layer was 0.8 nm. An area of 15 nm was observed in a cross section TEM image. An average of thicknesses was calculated as the thickness. 500×t/T was 2.

Example 2

In an example 2, the amount of Au in the Au—Ni alloy target was 2.0 at %. Other conditions were the same as those of the example 1. In the example 2, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.8 nm. The diffusion of Au stopped in a predetermined thickness at a predetermined temperature, because the diffusion of Au was sufficient. Therefore, an Au-containing layer having the same thickness was formed even if the whole amount of Au was changed. 500×t/T was 2. The capacity and the lifetime were the same as those of the example 1.

Example 3

In an example 3, the amount of Au in the Au—Ni alloy target was 2.0 at %. The firing temperature was higher than that of the example 1. Other conditions were the same as those of the example 1. In the example 3, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 1.0 nm. The thickness of the Au-containing layer was larger than that of the example 2 even if the whole amount of Au was the same as that of the example 2, because the firing temperature was increased. 500×t/T was 2.5. The capacity was the same as those of the examples 1 and 2. The loaded lifetime was improved. It is thought that the interface barrier became stable because the thickness of the Au-containing layer was large.

Example 4

In an example 4, the amount of Au in the Au—Ni alloy target was 1.0 at %. The time of the firing process was smaller than that of the example 1. Other conditions were the same as those of the example 1. In the example 4, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.5 nm. The thickness of the Au-containing layer was smaller than that of the example 1 even if the whole amount of Au was the same as that of the example 1, because the firing time was decreased. 500×t/T was 1.25. The capacity was the same as those of the examples 1 to 3. The loaded lifetime was slightly shorter than that of the example 1. It is thought that the interface barrier became unstable because the thickness of the Au-containing layer was small.

Example 5

In an example 5, an Au target and a Ni target were separately prepared. In the sputtering, the Au target and the Ni target were used together with each other. The Au concentration of the internal electrode pattern was 1.0 at %. Other conditions were the same as those of the example 1. In the example 5, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.8 nm. 500×t/T was 2. The capacity and the loaded lifetime were the same as those of the example 1.

Example 6

In an example 6, an Au target and a Ni target were separately prepared. Au, Ni and Au were formed in this order on the dielectric green sheet. The surface of Ni was covered by Au having a thickness of 1.0 nm. The Au concentration of whole of the formed internal electrode pattern was 1.0 at %. Other conditions were the same as those of the example 1. In the example 6, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.8 nm. The Au layer having the thickness of 1 nm just after film formation diffused during the firing. Thereby, the thickness of the Au-containing layer became 0.8 nm after the firing. 500×t/T was 2. The capacity and the loaded lifetime were the same as those of the example 1.

Example 7

In an example 7, Au—Ni alloy paste was printed on the dielectric green sheet. The Au concentration in the alloy was 1.0 at %. Other conditions were the same as those of the example 1. In the example 7, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.8 nm. 500×t/T was 2. The capacity and the loaded lifetime were the same as those of the example 1.

Comparative Example 1

In a comparative example 1, a pure Ni target was used. Other conditions were the same as those of the example 1. In the comparative example 1, the thickness of the internal electrode layers was 200 nm. The capacity was the same as that of the example 1. However, the loaded lifetime was shorter than that of the example 1. It is thought that this was because the effect of the interface barrier caused by the Au-containing layer was not achieved.

Comparative Example 2

In a comparative example 2, an amount of Pt in a Pt—Ni alloy target was 0.5 at %. Other conditions were the same as those of the example 1. In the comparative example 2, the thickness of the internal electrode layers was 200 nm. There was no Pt-containing layer on each of interfaces between the internal electrode layers and the dielectric layers. The capacity was the same as that of the example 1. However, the loaded lifetime was shorter than that of the example 1. It is thought that the interface barrier was controlled by Ni because there was not segregation of Pt on the interfaces although Pt easily makes a barrier.

Comparative Example 3

In a comparative example 3, the amount of Au in the Au—Ni alloy target was 2.5 at %. Other conditions were the same as those of the example 1. In the comparative example 3, the thickness of the internal electrode layers was 200 nm. An Au-containing layer of which an Au concentration with respect to all detected elements was 5 at % or more was formed on each of interfaces between the internal electrode layers and the dielectric layers. The thickness of the Au-containing layer was 0.8 nm. The diffusion of Au sufficiently progressed as well as the example 2. Therefore, even if the initial Au concentration was high, the thickness of the Au-containing layer was stable at 0.8 nm. 500×t/T was 2. The initial characteristic was open. It is thought that the melting point decreased and the internal electrode layers were broken because the added amount of Au was large. The loaded lifetime was not evaluated because the initial characteristic was open.

Figure 11:
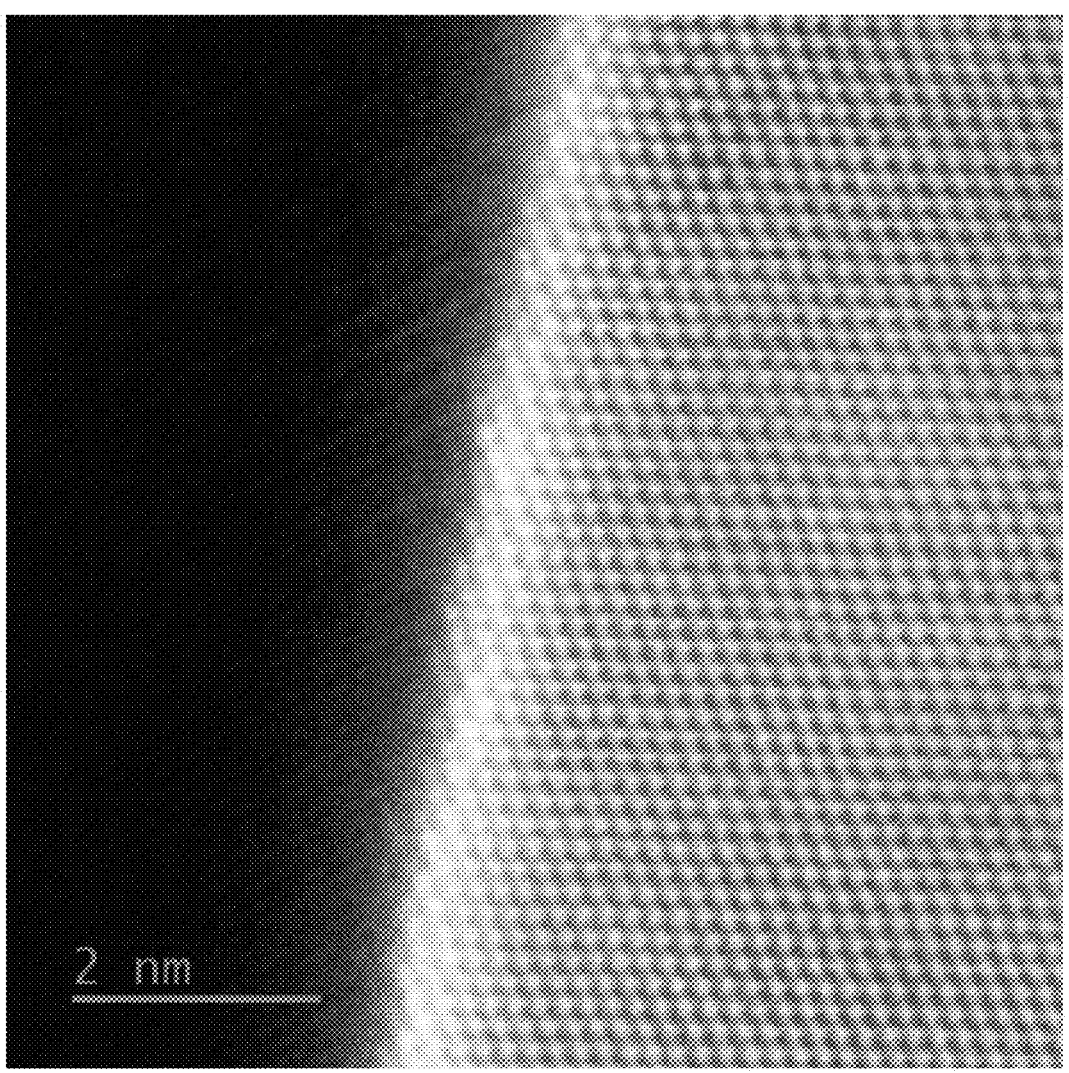
FIG. 11 illustrates a TEM image obtained by observing an outermost surface of an internal electrode layer of a sample of an example 2.
Figure 12:
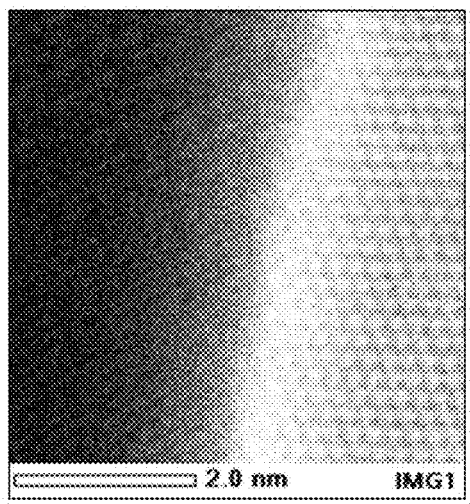
FIG. 12 illustrates a mapping image of distribution of elements of an image of FIG. 11.
Figure 12:
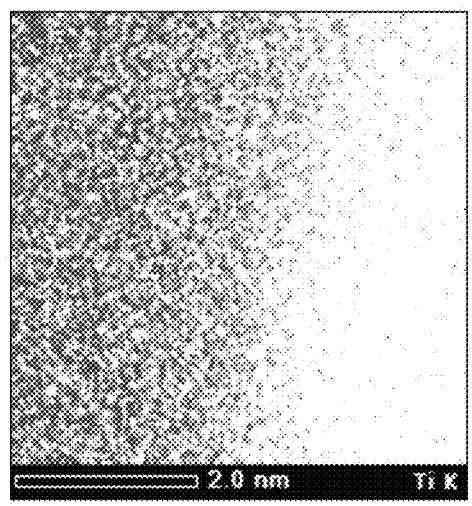
Figure 12:
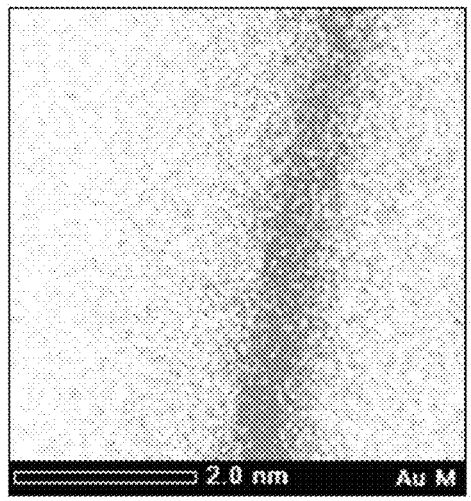
Figure 12:
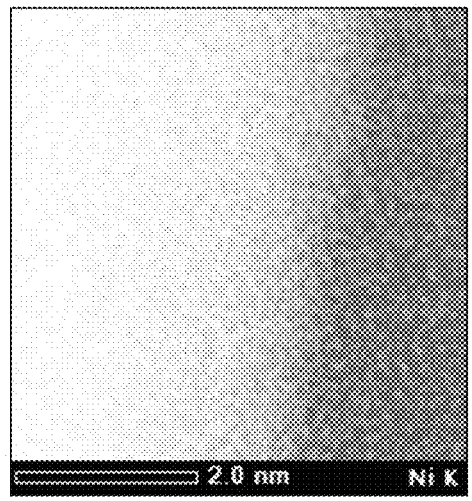

FIG. 11 illustrates a TEM (transmission electron microscope) image obtained by observing vicinity of an outermost surface of the internal electrode layer of the sample of the example 2. In the image, the brightness gets larger when an observed element is heavier or denser. As observed in FIG. 11, a bright area was observed in the interface between the Ni layer and the dielectric layer. The crystal orientation matches the Ni base material well in the bright area. The bright area has a thickness of 3 atoms or the like from the interface. FIG. 12 illustrates a mapping image of distribution of the elements of FIG. 11. The left upper figure of FIG. 12 is a part of FIG. 11. The right upper figure of FIG. 12 is the observed result of Ti. The left lower figure of FIG. 12 is the observed result of Au. The right lower figure of FIG. 12 is the observed result of Ni. The signal of Au is concentrated on the outermost surface of the Ni layer. The signal of Au has a thickness of 0.5 nm or so. From the results, in the example 2, it was observed that the Au-containing layer of 0.5 nm was formed.

Figure 13:
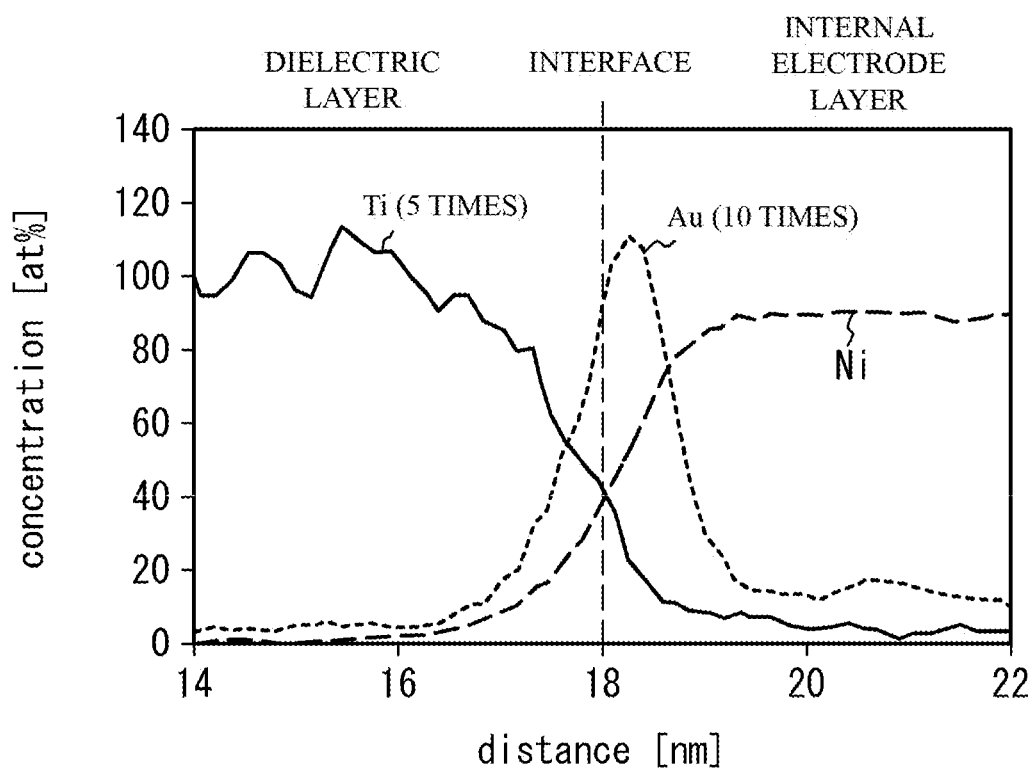
FIG. 13 illustrates a result of an analysis of each elements in a range sandwiching an interface between a Ni layer and a dielectric layer of a sample of an example 2.
Figure 14:
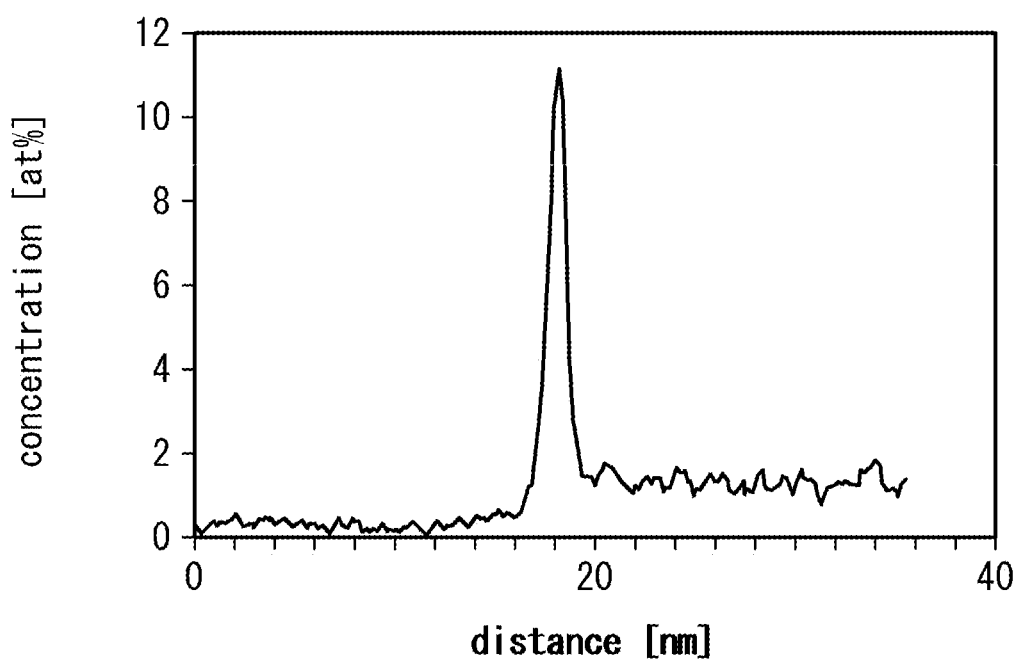
FIG. 14 illustrates extracted results of only Au signal in an enlarged horizontal axis range of plots in FIG. 13.

FIG. 13 is the results of a line analysis of each element concentration in a range sandwiching the interface between the Ni layer and the dielectric layer of the sample of the example 2. The vertical axis indicates concentrations of object elements with respect to all detected elements at the point. Therefore, the vertical axis does not indicate Au/(Au+Ni). The measured concentration of Ti is quintupled and plotted. The measured concentration of Au is increased by ten times and plotted. The interface between the dielectric layer and the internal electrode layer is an intersection of the plotted line of Ti and the plotted line Ni of FIG. 13. As illustrated in FIG. 13, the signal of Au is not maximum just on the interface but is maximum at a position on the side of Ni from the interface by 0.5 nm. FIG. 14 illustrates the extracted results of only the Au signal in the enlarged horizontal axis range of the plots in FIG. 13. As illustrated in FIG. 14, the Au signal locally gets larger near the interface, and a clear difference of the Au concentration on the both sides of the interface is observed.

Figure 15:
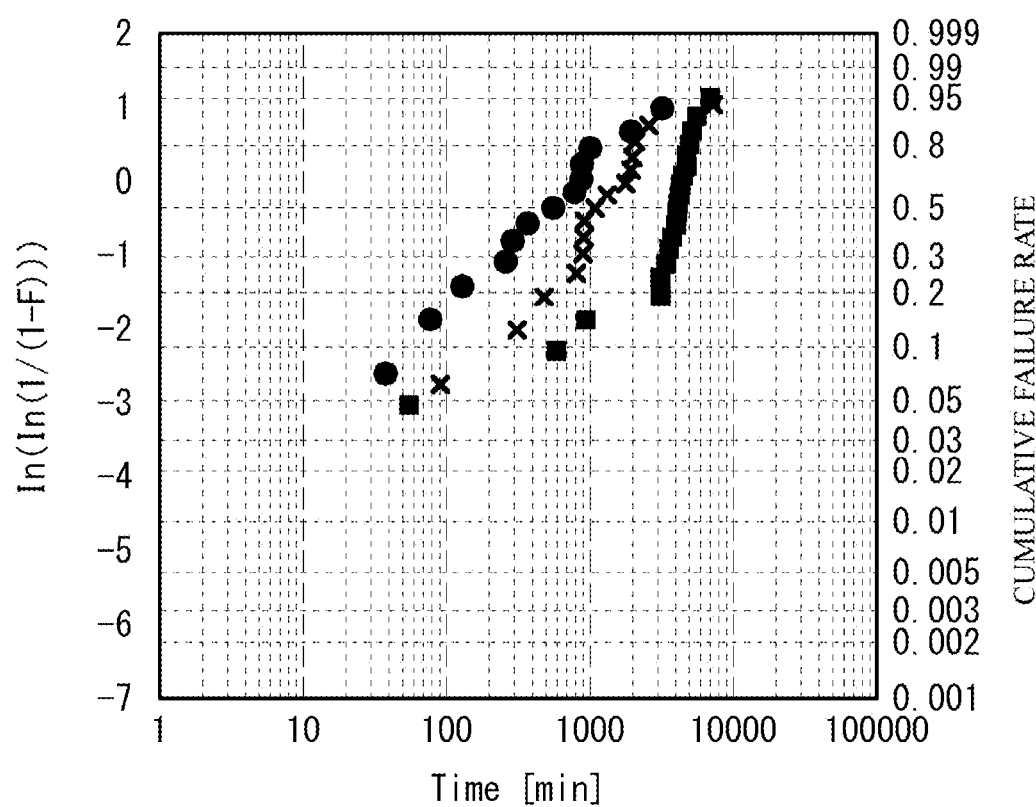
FIG. 15 illustrates Weibull plot indicating results of a HALT test.

The loaded lifetime of each sample of the examples 1 to 7 and the comparative examples 1 to 3 is evaluated by performing HALT (Highly accelerated lifetime test) of 125 C/18V. FIG. 15 illustrates Weibull plot indicating the results of the HALT test of each sample of the example 2, the comparative example 1 and the comparative example 2. The horizontal axis indicates a time until breakdown. The vertical axis indicates a cumulative failure rate function. As illustrated in FIG. 15, an absolute value of the lifetime of a sample using Au is larger than a sample having an internal electrode layer made of only Ni. An inclination of the plots of the sample using Au is larger (variation of lifetime is small) than the sample having the internal electrode layer made of only Ni. In FIG. 15, "●" are the results of the comparative example 1. "X" are the results of the comparative example 2. "■" are the results of the example 2.

Table 1 shows the measured results of the capacity and the loaded lifetime of each sample of the examples 1 to 7 and the comparative examples 1 to 3. The capacity was measured under the condition of frequency of 1 kHz/amplitude of 0.5 V with use of an LCR meter. The loaded lifetime is a time from the load start of 125 C/18V until the leak current exceeds 1 mA.

TABLE 1

|  | FILM FORMATION | T (nm) | t (nm) | C (at %) | 500 × t/T | CAPACITY (nF) | LOADED LIFETIME (min) |
| --- | --- | --- | --- | --- | --- | --- | --- |
| EXAMPLE 1 | Au—Ni ALLOY SPUTTERING | 200 | 0.8 | 1.0 | 2 | 500 | 3800 |
| EXAMPLE 2 | Au—Ni ALLOY SPUTTERING | 200 | 0.8 | 2.0 | 2 | 500 | 3800 |
| EXAMPLE 3 | Au—Ni ALLOY SPUTTERING | 200 | 1.0 | 2.0 | 2.5 | 500 | 4000 |
| EXAMPLE 4 | Au—Ni ALLOY SPUTTERING | 200 | 0.5 | 1.0 | 1.25 | 500 | 3500 |
| EXAMPLE 5 | SEPARATE TARGET SPUTTERING | 200 | 0.8 | 1.0 | 2 | 500 | 3800 |
| EXAMPLE 6 | Au→Ni→Au SPUTTERING | 200 | 0.8 | 1.0 | 2 | 500 | 3800 |
| EXAMPLE 7 | Au—Ni ALLOY PASTE | 200 | 0.8 | 1.0 | 2 | 500 | 3800 |
| COMPARATIVE EXAMPLE 1 | PURE Ni SPUTTERING | 200 | — | — | — | 500 | 550 |
| COMPARATIVE EXAMPLE 2 | Pt—Ni ALLOY SPUTTERING | 200 | — | 0.5 (Pt) | — | 500 | 1200 |
| COMPARATIVE EXAMPLE 3 | Au—Ni ALLOY SPUTTERING | 200 | 0.8 | 2.5 | 2 | OPEN | — |

Example 8

An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. Next, an internal electrode pattern was formed on the dielectric green sheet by the sputtering using an Au—Ni alloy target. A mask method using a metal mask was used for the patterning. A plurality of the dielectric green sheets on which the internal electrode pattern was formed were stacked. The number of the stack units was 100. Each of the internal electrode patterns were alternately shifted. After that, the resulting ceramic multilayer structure was cut into a chip having a predetermined size. Metal conductive paste to be the base layers of the external electrodes was applied to the two end faces of the ceramic multilayer structure. The ceramic multilayer structure was fired. Thus, multilayer ceramic capacitors were made.

The Au concentration with respect to all detected elements of the whole of the Au-containing layer of which an Au concentration with respect to all detected elements was 5 at % or more was 11 at %. The Au concentration with respect to all detected elements in the whole of the Ni layer of which an Au concentration with respect to all detected elements was less than 5 at % was 1 at %. The concentration difference was 10 at %.

Example 9

In an example 9, the internal electrode patterns were formed by the sputtering with use of the Au—Ni alloy target. The Au concentration with respect to all detected elements of the whole of the Au-containing layer of which an Au concentration with respect to all detected elements was 5 at % or more was 5.2 at %. The Au concentration with respect to all detected elements in the whole of the Ni layer of which an Au concentration with respect to all detected elements was less than 5 at % was 1 at %. The concentration difference was 4.2 at %. Other conditions were the same as those of the example 8.

Example 10

In an example 10, the internal electrode patterns were formed by the sputtering with use of the Au—Ni alloy target. The Au concentration with respect to all detected elements of the whole of the Au-containing layer of which an Au concentration with respect to all detected elements was 5 at % or more was 5.2 at %. The Au concentration with respect to all detected elements in the whole of the Ni layer of which an Au concentration with respect to all detected elements was less than 5 at % was 4.5 at %. The concentration difference was 0.7 at %. Other conditions were the same as those of the example 8.

Example 11

In an example 11, the internal electrode patterns were formed by the sputtering with use of the Au—Ni alloy target. The Au concentration with respect to all detected elements of the whole of the Au-containing layer of which an Au concentration with respect to all detected elements was 5 at % or more was 16 at %. The Au concentration with respect to all detected elements in the whole of the Ni layer of which an Au concentration with respect to all detected elements was less than 5 at % was 1 at %. The concentration difference was 15 at %. Other conditions were the same as those of the example 8.

Example 12

In an example 12, an Au target and a Ni target were separately prepared. The internal electrode patterns were formed by the sputtering with use of the Au target and the Ni target. The Au concentration with respect to all detected elements of the whole of the Au-containing layer of which an Au concentration with respect to all detected elements was 5 at % or more was 11 at %. The Au concentration with respect to all detected elements in the whole of the Ni layer of which an Au concentration with respect to all detected elements was less than 5 at % was 1 at %. The concentration difference was 10 at %. Other conditions were the same as those of the example 8.

Example 13

In an example 13, an Au target and a Ni target were separately prepared. The internal electrode patterns were formed by the sputtering with use of the Au target and the Ni target. Au, Ni and Au were formed in this order on the dielectric green sheet. The surface of Ni was covered by Au. The Au concentration with respect to all detected elements of the whole of the Au-containing layer of which an Au concentration with respect to all detected elements was 5 at % or more was 11 at %. The Au concentration with respect to all detected elements in the whole of the Ni layer of which an Au concentration with respect to all detected elements was less than 5 at % was 1 at %. The concentration difference was 10 at %. Other conditions were the same as those of the example 8.

Example 14

In an example 14, Au—Ni alloy paste was printed on the dielectric green sheet. The Au concentration with respect to all detected elements of the whole of the Au-containing layer of which an Au concentration with respect to all detected elements was 5 at % or more was 11 at %. The Au concentration with respect to all detected elements in the whole of the Ni layer of which an Au concentration with respect to all detected elements was less than 5 at % was 1 at %. The concentration difference was 10 at %. Other conditions were the same as those of the example 8.

Example 15

In an example 15, the internal electrode patterns were formed by the sputtering with use of the Au—Ni alloy target. The Au concentration with respect to all detected elements of the whole of the Au-containing layer of which an Au concentration with respect to all detected elements was 5 at % or more was 17 at %. The Au concentration with respect to all detected elements in the whole of the Ni layer of which an Au concentration with respect to all detected elements was less than 5 at % was 1 at %. The concentration difference was 16 at %. Other conditions were the same as those of the example 8.

Comparative Example 4

In a comparative example 4, the internal electrode patterns were formed by the sputtering with use of the Au—Ni alloy target. In the comparative example 4, there was no Au-containing layer of which an Au concentration with respect to all detected elements was 5 at % or more. The Au concentration with respect to all detected elements was 4.9 at % in the whole of a portion of which an Au concentration with respect to all detected elements was relatively high. The Au concentration with respect to all detected elements was 4.4 at % in the whole of a portion of which an Au concentration with respect to all detected elements was relatively low. The concentration difference was 0.5 at %. Other conditions were the same as those of the example 8.

Comparative Example 5

In a comparative example 5, the internal electrode patterns were formed by the sputtering with use of the Au—Ni alloy target. The Au concentration with respect to all detected elements of the whole of the Au-containing layer of which an Au concentration with respect to all detected elements was 5 at % or more was 5.2 at %. The Au concentration with respect to all detected elements in the whole of the Ni layer of which an Au concentration with respect to all detected elements was less than 5 at % was 4.8 at %. The concentration difference was 0.4 at %. Other conditions were the same as those of the example 8.

The capacity and the loaded lifetime were measured with respect to each of the examples 8 to 15 and the comparative examples 4 and 5, by using the same method as the examples 1 to 7 and the comparative examples 1 to 3. Table 2 shows the results. As shown in Table 2, the capacity and the loaded lifetime were high in the examples 8 to 15. It is thought that this was because the difference between the Au concentration with respect to all detected elements of the whole of the Au-containing layer and the Au concentration with respect to all detected elements of the whole of the Ni layer was 0.5 at % or more, and the breaking of the internal electrode layer was suppressed, and the insulation reliability was improved. The lifetimes of the examples 8 to 14 was longer than that of the example 15. From the result, it is preferable that the difference between the Au concentration with respect to all detected elements of the whole of the Au-containing layer and the Au concentration with respect to all detected elements of the whole of the Ni layer is 15 at % or less.

TABLE 2

| | FILM FORMATION | Au CON. IN Ni LAYER (at %) | Au CON. IN Au LAYER (at %) | Au CONCENTRATION DIFFERENCE (at %) | CAPACITY (nF) | LOADED LIFETIME (min) |
|---|---|---|---|---|---|---|
| EXAMPLE 8 | Au—Ni ALLOY SPUTTERING | 1 | 11 | 10 | 500 | 4000 |
| EXAMPLE 9 | Au—Ni ALLOY SPUTTERING | 1 | 5.2 | 4.2 | 500 | 3900 |
| EXAMPLE 10 | Au—Ni ALLOY SPUTTERING | 4.5 | 5.2 | 0.7 | 480 | 4000 |
| EXAMPLE 11 | Au—Ni ALLOY SPUTTERING | 1 | 16 | 15 | 470 | 3800 |
| EXAMPLE 12 | SEPARATE TARGET SPUTTERING | 1 | 11 | 10 | 500 | 4000 |
| EXAMPLE 13 | Au→Ni→Au SPUTTERING | 1 | 11 | 10 | 500 | 4000 |
| EXAMPLE 14 | Au—Ni ALLOY SPASTE | 1 | 11 | 10 | 500 | 4000 |
| EXAMPLE 15 | Au—Ni ALLOY SPUTTERING | 1 | 17 | 16 | 400 | 3600 |
| COMPARATIVE EXAMPLE 4 | Au—Ni ALLOY SPUTTERING | 4.4 | 4.9 | 0.5 | 480 | 2000 |
| COMPARATIVE EXAMPLE 5 | Au—Ni ALLOY SPUTTERING | 4.8 | 5.2 | 0.4 | OPEN | |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which a plurality of dielectric layers of which a main component is ceramic and a plurality of internal electrode layers are stacked,
wherein a main component of the plurality of internal electrode layers is Ni,
wherein the plurality of internal electrode layers include Au,
wherein each of the plurality of internal electrode layers includes an Au-containing layer of which an Au concentration with respect to all detected elements is 5 at % or more, on an interface between the each of the plurality of internal electrode layers and a dielectric layer next to the each of the plurality of internal electrode layers, and
wherein a relationship of $C \leq 500 \times t/T$ is satisfied when a thickness of the each of the plurality of internal electrode layers is T nm, a thickness of the Au-containing layer is t nm, and an Au concentration with respect to a total of Ni and Au in a whole of the each of the plurality of internal electrode layers is C at %.

2. The ceramic electronic device as claimed in claim 1, wherein the thickness t nm is 1 nm or less than 1 nm.

3. The ceramic electronic device as claimed in claim 1, wherein the Au concentration with respect to all detected elements in a whole of the Au-containing layer is 5 at % or more and 15 at % or less.

4. The ceramic electronic device as claimed in claim 1, wherein a Ni concentration is higher than the Au concentration in a surface portion of each of the dielectric layers on the side of the each of the internal electrode layers.

5. The ceramic electronic device as claimed in claim 1, wherein the Au concentration with respect to a total of Ni and Au in a whole of the each of the internal electrode layers is 20 at % or less.

6. The ceramic electronic device as claimed in claim 1, wherein the Au concentration with respect to a total of Ni and Au in a portion of the internal electrode layers other than the Au-containing layer is 0.01 at % or more and 20 at % or less.

7. The ceramic electronic device as claimed in claim 1, wherein the plurality of dielectric layers include barium titanate.

8. The ceramic electronic device as claimed in claim 1, wherein the thickness T of the each of the plurality of internal electrode layers is 10 nm or more and 1000 nm or less.

9. A ceramic electronic device comprising:
a multilayer chip in which a plurality of dielectric layers of which a main component is ceramic and a plurality of internal electrode layers are stacked,
wherein a main component of the plurality of internal electrode layers is Ni,
wherein the plurality of internal electrode layers includes Au,
wherein each of the plurality of internal electrode layers include an Au-containing layer of which an Au concentration with respect to all detected elements is 5 at % or more, on an interface between each of the plurality of dielectric layers and each of the plurality of internal electrode layers, and
wherein a difference between an Au concentration with respect to all detected elements of a whole of the Au containing layer and an Au concentration with respect to all detected elements of a whole of a portion other than the Au-containing layer in each of the plurality of internal electrode layers is 0.5 at % or more.

10. The ceramic electronic device as claimed in claim 9, wherein the difference between the Au concentration with respect to all detected elements of the whole of the Au containing layer and the Au concentration with respect to all detected elements of the whole of the portion other than the Au-containing layer in each of the plurality of internal electrode layers is 15 at % or less.

11. The ceramic electronic device as claimed in claim 9, wherein the Au concentration with respect to all detected elements in the whole of the portion other than the Au-containing layer in each of the plurality of internal electrode layers is 0 at % or more and 4.5 at % or less.

* * * * *